United States Patent
Vauchel et al.

(10) Patent No.: US 8,985,506 B2
(45) Date of Patent: Mar. 24, 2015

(54) AIR INTAKE FOR AIRCRAFT NACELLE, AND PROPULSION ASSEMBLY INCLUDING SUCH AIR INTAKE

(75) Inventors: Guy Bernard Vauchel, Harfleur (FR); Laurent Georges Valleroy, Le Havre (FR); Stéphane Beilliard, Toulouse (FR); Fabien Bravin, St. Genies Bellevue (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 12/864,901

(22) PCT Filed: Jan. 21, 2009

(86) PCT No.: PCT/FR2009/000061
§ 371 (c)(1),
(2), (4) Date: Jul. 28, 2010

(87) PCT Pub. No.: WO2009/109712
PCT Pub. Date: Sep. 11, 2009

(65) Prior Publication Data
US 2010/0320316 A1   Dec. 23, 2010

(30) Foreign Application Priority Data

Jan. 29, 2008   (FR) ...................................... 08 00471

(51) Int. Cl.
*B64D 33/02* (2006.01)
*F01D 21/00* (2006.01)
*F02C 7/045* (2006.01)

(52) U.S. Cl.
CPC ........ *B64D 33/02* (2013.01); *B64D 2033/0206* (2013.01); *B64D 2033/0286* (2013.01); *F01D 21/00* (2013.01); *F02C 7/045* (2013.01); *F05D 2220/36* (2013.01)

USPC .......................... 244/53 B; 244/1 N; 181/210

(58) Field of Classification Search
CPC ........... B64D 33/02; B64D 2033/0206; B01D 21/045
USPC ........... 415/9; 244/1 N, 53 B; 137/15.1, 15.2; 181/210, 214, 292
See application file for complete search history.

(56) References Cited

U.S. PATENT DOCUMENTS 4,293,053 A * 10/1981 Shuttleworth et al. ........ 181/213
5,336,044 A *  8/1994 Forrester ........................... 415/9
6,123,170 A     9/2000 Porte
(Continued)

FOREIGN PATENT DOCUMENTS

FR        2869360 A1   10/2005
FR        2898870 A1    9/2007
(Continued)

OTHER PUBLICATIONS

International Saerch Report PCT/FR2009/000061; Dated Jul. 23, 2009.

*Primary Examiner* — Rob Swiatek
*Assistant Examiner* — Timothy Schwarz
(74) *Attorney, Agent, or Firm* — Brinks Gilson & Lione

(57) ABSTRACT

The invention relates to an air intake for an aircraft nacelle that includes a shroud that can be mounted on the fan casing of a turbojet engine. The shroud is sized so as to define a circumferential gap relative to the casing. Punctual linking means between the shroud and the casing are discretely distributed at the periphery of the shroud.

10 Claims, 3 Drawing Sheets

(56) References Cited

U.S. PATENT DOCUMENTS

| | | | |
|---|---|---|---|
| 6,305,899 B1 * | 10/2001 | Saunders | 415/9 |
| 6,382,905 B1 * | 5/2002 | Czachor et al. | 415/9 |
| 6,857,669 B2 * | 2/2005 | Porte et al. | 285/368 |
| 7,334,393 B2 * | 2/2008 | Porte | 60/226.1 |
| 7,402,022 B2 * | 7/2008 | Harper et al. | 415/9 |
| 7,563,069 B2 * | 7/2009 | Harper | 415/9 |
| 7,866,440 B2 * | 1/2011 | Douglas | 181/213 |
| 8,092,169 B2 * | 1/2012 | Cloft et al. | 415/220 |
| 2005/0252195 A1 * | 11/2005 | Porte et al. | 60/226.1 |
| 2009/0229242 A1 * | 9/2009 | Schwark | 60/226.1 |

FOREIGN PATENT DOCUMENTS

| | | | |
|---|---|---|---|
| GB | 2407134 A | 4/2005 | |
| WO | WO02/14149 A1 * | 2/2002 | B64D 33/02 |

\* cited by examiner

AIR INTAKE FOR AIRCRAFT NACELLE, AND PROPULSION ASSEMBLY INCLUDING SUCH AIR INTAKE

TECHNICAL FIELD

The present invention concerns in particular an air intake for aircraft nacelle.

BACKGROUND

An airplane is propelled by one or several propulsion assemblies each comprising a turbojet engine housed in a tubular nacelle. Each propulsion assembly is attached to the plane by a mast generally situated under a wing or at the fuselage.

A nacelle generally comprises a structure including an air intake upstream from the engine, a middle section designed to surround a fan of the turbojet engine, a downstream section housing thrust reverser means and designed to surround the combustion chamber of the turbojet engine, and generally ends with a jet nozzle whereof the outlet is situated downstream from the turbojet engine.

The air intake comprises, on one hand, an intake lip adapted to allow optimal collection towards the turbojet engine of the air necessary to supply the fan and internal compressors of the turbojet engine, and on the other hand, a downstream structure on which the lip is attached and designed to suitably channel the air towards the vanes of the fan. The assembly is attached upstream from a fan casing.

The inner face of the downstream air intake structure is formed by a tubular member frequently called "shroud", generally having an acoustic function (structure formed by a honeycomb assembly of panels).

The connection of this shroud with the fan casing is done by a flange with an L-shaped section, comprising on one hand a portion of tubular shape fixed on the shroud, and on the other hand a return of annular shape fastened on the fan casing: documents FR2847304 and FR2869360 show such examples of fastening.

In case of deformation or rupture of vane of the fan (commonly referred to as "FBO" for "Fan Blade Out"), the turbojet engine causes very significant vibrations and/or shocks that reverberate on the entire nacelle, and in particular on the air intake.

The latter, which has a significant overhang relative to the rest of the nacelle, is vulnerable to such vibrations/shocks, which can cause local deformations or even the ruin of this air intake.

BRIEF SUMMARY

The present invention aims in particular to provide means making it possible to limit this risk of deformation or ruin of the air intake in case of deformation or rupture of the vane of the fan of the turbojet engine.

This aim of the invention is achieved with an air intake for aircraft nacelle comprising a shroud capable of being mounted on the fan casing of a turbojet engine, said shroud being dimensioned to define a circumferential gap relative to said casing, and punctual linking means of said shroud to said casing being discretely distributed at the periphery of said shroud.

This discrete linking of the shroud to the air intake with the fan casing allows elastic and/or plastic movements of the shroud relative to the fan casing in case of vibrations or shocks created in particular by a loss of vane: these relative movements make it possible to absorb part of the energy associated with these vibrations or these shocks, and thereby to reduce the impact of these vibrations or shocks on the air intake assembly.

In this way, it is possible to considerably reduce the risk of deformation or ruin of this air intake.

According to other optional features of this air intake:

said linking means comprise a plurality of support beams fastened equidistantly on said shroud, and lugs mounted articulated on these support beams and capable of being fastened on said casing;

said lugs are adapted to be mounted on a flange integrated to said casing;

said lugs are adapted to be mounted directly on the outer face of said casing;

said linking means comprise a plurality of support beams fastened equidistantly on said shroud and adapted to be mounted directly on a flange integrated to said fan casing;

said linking means comprise a plurality of orifices formed on the downstream edge of said shroud, capable of being passed through by fastening means mounted on the upstream edge of said casing;

said shroud includes an annular groove in which said orifices lead;

said shroud comprises an annular recess in which said orifices lead, a cover flap being provided to close said recess;

said linking means comprise a plurality of lugs distributed on the outer face of said shroud, capable of engaging with fastening means mounted on the upstream edge of said casing;

said shroud is an acoustic shroud: such a shroud makes it possible to absorb part of the energy from the sound waves emitted by the fan and the turbojet engine;

said shroud is adapted to extend in part under the upstream edge of said casing: this arrangement makes it possible to bring the acoustic shroud closer to the sound emission zones of the fan and the turbojet engine, and to thereby improve the sound attenuation.

The present invention also concerns an assembly comprising an air intake including a shroud according to the preceding and a turbojet engine including a fan casing on which said shroud is mounted.

According to optional features of that assembly:

the upstream edge of said casing includes a flange on which said lugs are fastened;

the upstream edge of said casing includes orifices receiving said fastening means;

the inner face of said casing includes a step defining the gap between said shroud and the casing;

said step has a ramp;

said casing has a tubular tab closing the recess formed in said shroud;

the upstream edge of said casing is configured to define a gap with said shroud upstream and downstream from said lugs.

The present invention also concerns a propulsion assembly for aircraft comprising an assembly according to the preceding.

BRIEF DESCRIPTION OF THE DRAWINGS

Other features and advantages of the present invention will appear in light of the following description, and upon examination of the appended figures, in which.

In all of these figures, identical or similar numerical references designate identical or similar members or sets of members.

DETAILED DESCRIPTION

In the following, the terms "upstream" and "downstream" must be understood in relation to the direction of circulation of the air and gases in the propulsion assembly, and correspond in this case to the left and right, respectively, of the figures.

Figure 1:
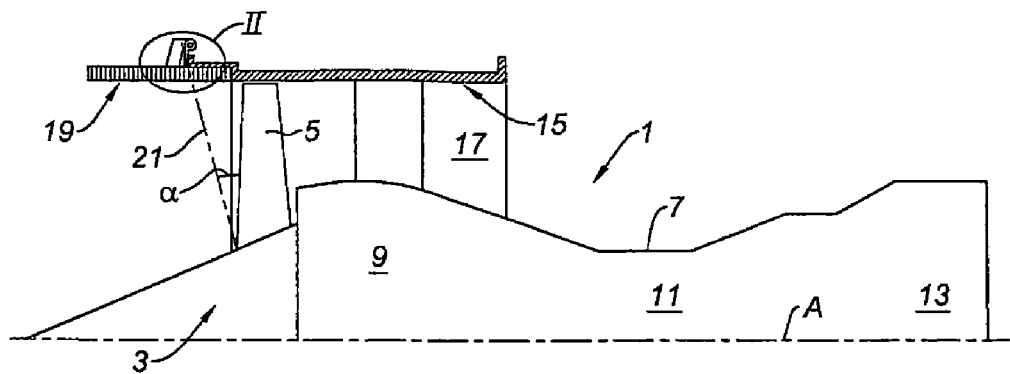
FIG. 1 is a partial diagrammatic view in axial cross-section of a propulsion assembly according to the invention, in which one can see in particular the acoustic shroud of the air intake and the turbojet engine.

In reference now to FIG. 1, we have diagrammatically illustrated an aircraft turbojet engine, including, in its upstream portion, a fan 3 provided with vanes 5, and in its downstream portion 7 strictly speaking, comprising as known in itself its compression 9, combustion 11 and propulsion 13 stages.

Around the fan 3 and the compression stage 9, is a fan casing 15, defining a cold air stream 17 with the engine 1.

Upstream from this casing 15, and situated in the extension thereof, is a tubular member 19, frequently designated by "shroud", which is part of the nacelle designed to surround the turbojet engine 1.

More precisely, this shroud 19 constitutes the inner face of the air intake of the nacelle, as was indicated in the preamble of this description.

In all of the figures of this invention, this shroud 19 is illustrated in the form of a structure having acoustic absorption properties, such as a honeycomb structure: indeed, such a structure is generally used to reduce the energy of the sound waves emitted by the turbojet engine 1 and the fan 3.

One will, however, bear in mind that the present invention is in no way limited to a shroud 19 having such acoustic properties.

One will also note that, in all of the figures of the present invention, we have illustrated a fan casing 15 extending to the debris exhaust cone 21, but this invention is in no way limited to that particular case (as a reminder, the cone 21, defined by an angle α relative to the feet of the vanes 5, corresponds to the zone in which one considers that debris coming from a vane rupture can be ejected and strike the casing 15).

Figure 2:
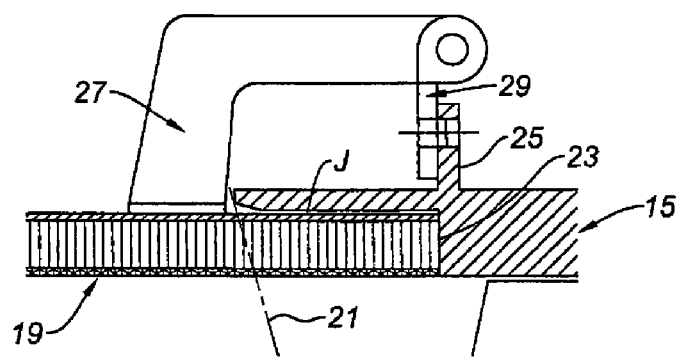
FIG. 2 is a detail view of the cooperation zone of the shroud of the air intake with the fan casing of the turbojet engine, corresponding to zone II illustrated in FIG. 1, FIGS. 3 and 4 are views of an alternative embodiment to that shown in FIG. 1, and FIGS. 5 to 8 illustrate four alternatives of another embodiment according to the invention.

In the embodiment illustrated in FIGS. 1 and 2, one can see that the upstream edge of the casing 15 defines an annular housing 23 situated in the zone of the exhaust cone 21, and receiving the downstream edge of the casing 15.

At this housing 23, is an essentially annular flange 25, integrated into the outer face of the shroud 19.

A plurality of support beams 27, essentially L-shaped, are fastened on the outer face of the shroud 19.

These support beams extend to the flange 25, and include, at their downstream end, an articulated lug 29 fastened (for example by screwing) to the flange 25.

These support beams 27 are preferably distributed equidistantly on the circumference of the shroud 19, and the geometry of the assembly is determined such that there is a slight gap J between the outer face of the shroud 19 and the inner face of the upstream edge of the casing 15.

Figure 3:
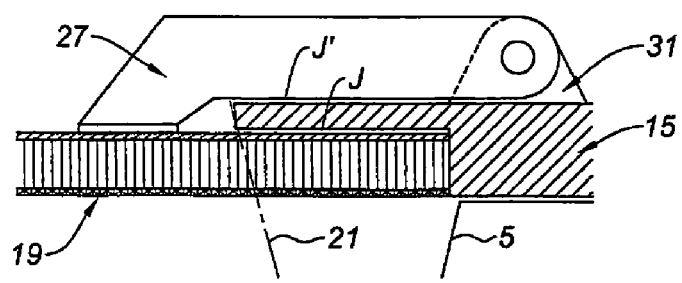

The alternative of FIG. 3 differs from the preceding in that the support beam 27 is practically laying down along the outer face of the casing 15, and in that this support beam is directly connected to said casing via a fitting 31.

Other than the gap J similar to that of FIG. 2, a gap J' is formed between the support beam 27 of the outer face of the casing 15.

Figure 4:
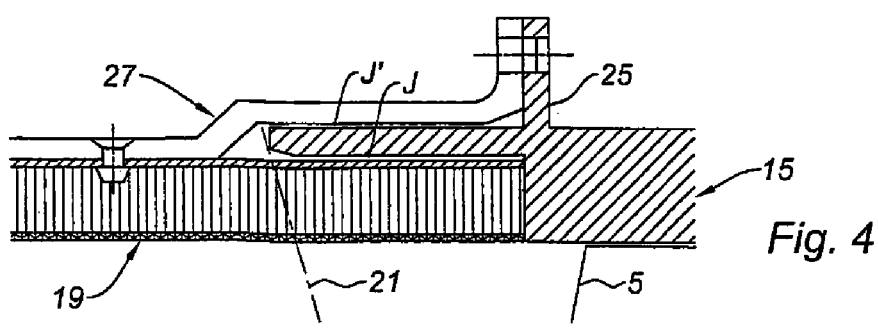

FIG. 4 illustrates another possible geometry of the support beam 27, in this case directly linked to the flange 25, while keeping the gaps J and J' similar to those of FIG. 3.

Figure 5:
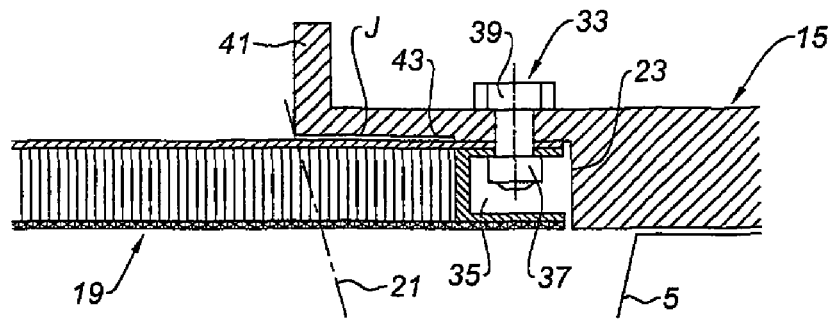

In the embodiment of FIG. 5, the shroud 19 is linked to the inner face of the upstream edge of the casing 15 via a plurality of fastening means 33 of the screw-nut type.

More precisely, these fastening means 33 pass through orifices formed in the upstream edge of the casing 15 and in the downstream edge of the shroud 19.

The orifices formed in the downstream edge of the shroud 19 open into an annular groove 35 formed in the downstream edge of the shroud 19.

When this shroud 19 is a honeycomb acoustic shroud, the annular groove 35 can be defined by a compact zone (called monolithic) of the honeycomb structure.

It will be noted that this alternative assumes that all of the nuts 37 are fastened in the groove 35 before the placement of the associated screws 39, the groove 35 in fact no longer being accessible once the shroud 19 has been placed inside the housing 23 defined in the upstream edge of the fan casing.

It will also be noted that, for reasons of structural resistance, it may be useful to provide an annular return 41 on the end of the upstream edge of the casing 15.

It will also be noted that, as in the preceding embodiment, a gap J is formed between the outer face of the shroud 19 and the inner face of the upstream edge of the casing 15, such a gap being able to be obtained using a step 43 provided on the inner face of the upstream portion of the fan casing 15.

Figure 6:
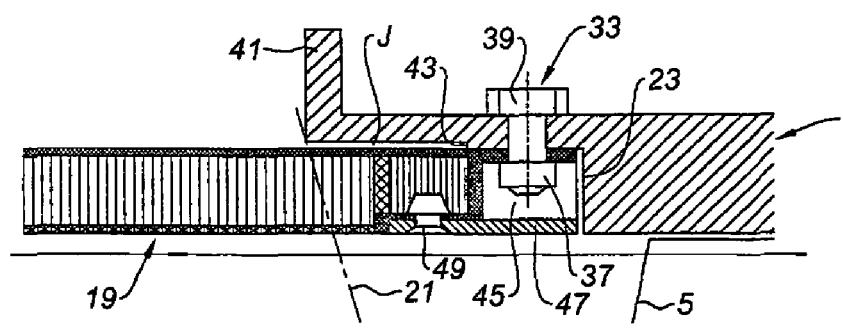

In the alternative illustrated in FIG. 6, the downstream edge of the shroud 19 no longer defines an annular groove as in the preceding alternative, but a simple annular recess 45, i.e. an open zone opposite the axis A of the turbojet engine.

This open annular zone allows the placement of nuts 37 and screws 39 after the shroud 19 has been inserted inside the housing 23, an essentially tubular cover flap 47 then being attached on the inner face of the shroud 19 is fastened using appropriate means 49 so as to close the recess 45 and thus allow the aerodynamic continuity between the shroud 19 and the fan casing 15.

It will be noted that, in this alternative as in the previous ones, a step 43 forms a gap J between the outer face of the shroud 19 and the inner face of the fan casing 15.

Figure 7:
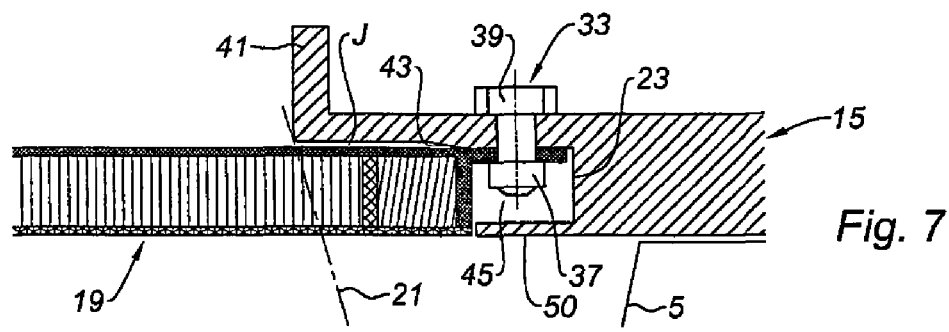

In the alternative illustrated in FIG. 7, the annular recess 45 of the shroud 19 is closed by a tubular tab 50 integral with the fan casing 15: in this alternative as in that of FIG. 5, one must provide for fastening the nuts 37 on the acoustic shroud 19 before inserting the latter inside the fan casing 15.

It will be noted that one can advantageously provide that the step 43 has a ramp shape, as illustrated in FIG. 7, making it possible to facilitate the insertion of the shroud 19 inside the fan casing 15.

Figure 8:
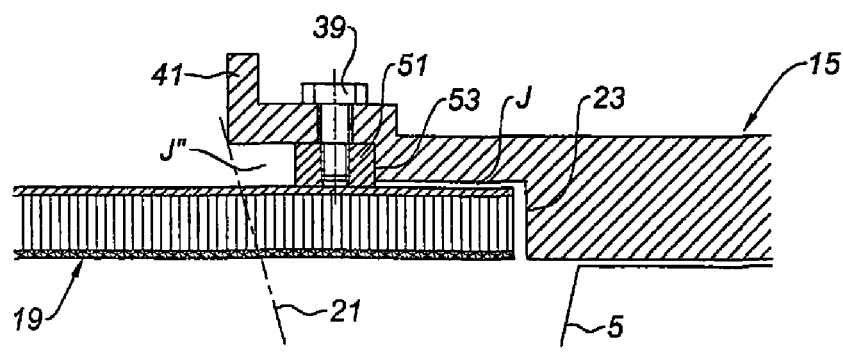
Figure 9:
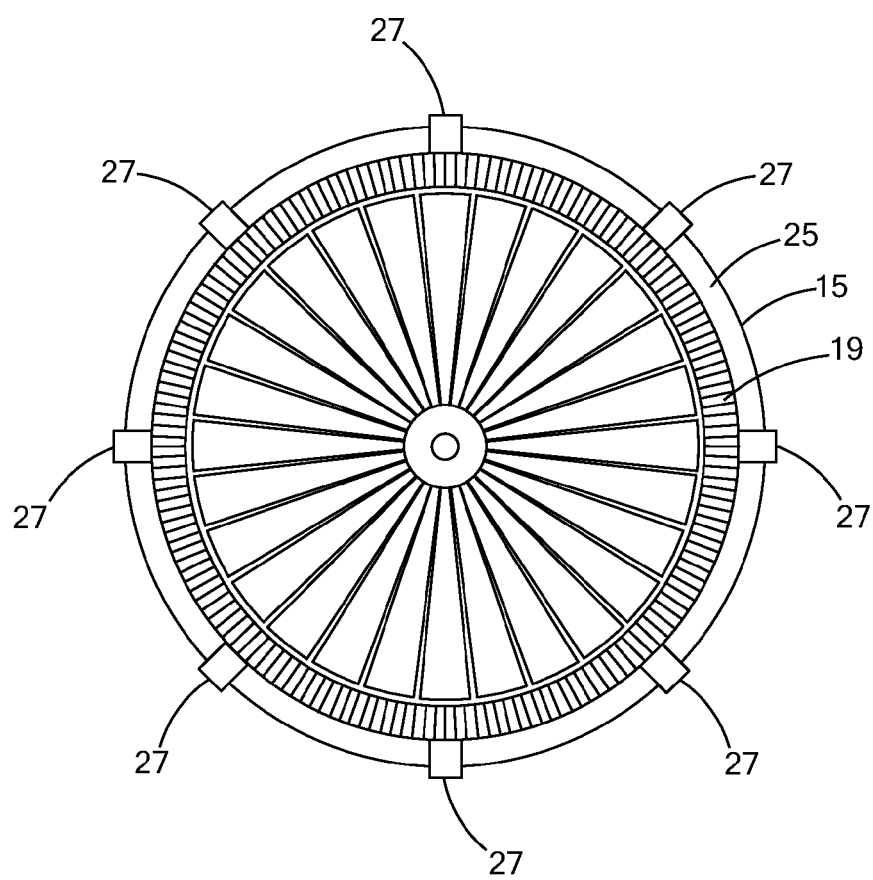
FIG. 9 illustrates a cross-sectional front view of the air intake which does not include any structural member to connect the shroud to the casing circumferentially between the support beams.

In the alternative illustrated in FIG. 8, lugs 51 are fastened on the outer face of the acoustic shroud 19, preferably equidistantly on the circumference of said shroud.

Other than the first housing 23, the upstream edge of the fan casing 15 has a geometry defining a second housing 53 allowing the positioning of the lugs 51.

Screws 39 pass through the upstream edge of the fan casing 15, and engage with these lugs 51.

Here again the geometry of the assembly is defined so as to allow a gap J downstream from the lugs 51 and a gap J″ upstream from said lugs.

As will have been understood in light of the preceding description, the common point to all of the embodiments and alternatives explained above lies in the fact that the shroud 19 is linked to the fan casing 15 by punctual means, i.e. by means distributed discretely at the circumference of these elements.

The geometry of the assembly is studied such that there is a gap between the shroud 19 and the fan casing 15.

Owing to all of these features, in case of deformation or rupture of one or several of the vanes 5 of the fan 3, causing vibrations or shocks of the turbojet engine 1, the shroud 19 can move elastically or plastically relative to the fan casing 15, thereby causing a dissipation of the energy transmitted by the turbojet engine 1 and making it possible to avoid the ruin of the air intake and of the nacelle.

It will be noted in particular that, in the case of the alternatives illustrated in FIGS. 5 and 8, it is in particular the elasticity of the shroud 19 itself (in particular when this is an acoustic shroud) that allows the energy dissipation.

Of course, the present invention is in no way limited to the embodiments and alternatives described and illustrated, provided as examples.

The invention claimed is:

1. An air intake for aircraft nacelle comprising a shroud being mounted on a fan casing of a turbojet engine, said shroud being dimensioned to define a circumferential gap relative to said casing, the shroud comprising discrete support beams distributed equidistantly around a circumference of the shroud, the support beams directly connecting said shroud to said casing without any intermediate connection part between said shroud and said casing, wherein the air intake does not include any structural member to connect said shroud to said casing circumferentially between the support beams, thereby allowing for radial movements of the shroud relative to the casing between the support beams.

2. The air intake according to claim 1, further comprises lugs mounted articulated on said support beams and being fastened on said casing.

3. The air intake according to claim 2, in which said lugs are adapted to be mounted on a flange integrated to said fan casing.

4. The assembly according to claim 3, in which the upstream edge of said casing includes a flange on which said lugs are fastened.

5. The air intake according to claim 2, in which said lugs are adapted to be mounted directly on an outer face of said casing.

6. The air intake according to claim 1, wherein said shroud is an acoustic shroud.

7. The air intake according to claim 1, in which said shroud is adapted to extend in part under an upstream edge of said casing.

8. The assembly according claim 1, in which an inner face of said casing includes a step defining the gap between said shroud and said casing.

9. The assembly according to claim 8, in which said step has a ramp.

10. A propulsion assembly for aircraft comprising an assembly according to claim 1.

* * * * *